US006877242B2

(12) United States Patent
Mackin et al.

(10) Patent No.: US 6,877,242 B2
(45) Date of Patent: Apr. 12, 2005

(54) ILLUMINATED CALIPER INSTRUMENT

(76) Inventors: Robert A. Mackin, 1033 Lake Point Way, Flagstaff, AZ (US) 86004; Jeffrey M. Mackin, 7125 125th Ave., SE., Snohomish, WA (US) 98290

( * ) Notice: Subject to any disclaimer, the term of this patent is extended or adjusted under 35 U.S.C. 154(b) by 0 days.

(21) Appl. No.: 10/178,259

(22) Filed: Jun. 25, 2002

(65) Prior Publication Data

US 2003/0000098 A1 Jan. 2, 2003

Related U.S. Application Data

(60) Provisional application No. 60/301,533, filed on Jun. 27, 2001.

(51) Int. Cl.[7] ............................................. G01B 5/00
(52) U.S. Cl. ..................... 33/558.01; 33/348; 33/348.2; 362/109; 362/253
(58) Field of Search .......................... 33/558.01, 27.02, 33/27.03–27.033, 807, 808, 348, 348.2; 362/109, 119, 120, 253

(56) References Cited

U.S. PATENT DOCUMENTS

| | | | | |
|---|---|---|---|---|
| 1,698,206 A | * | 1/1929 | Tipton ............................. 30/47 |
| 2,288,093 A | * | 6/1942 | Kaffenberger et al. ....... 362/578 |
| 2,515,292 A | * | 7/1950 | Carr ........................... 294/65.5 |
| 2,854,564 A | * | 9/1958 | Cohen et al. ................ 362/119 |
| 3,129,514 A | * | 4/1964 | Litner .......................... 33/1 H |
| 3,507,046 A | * | 4/1970 | Smith et al. .................. 33/808 |
| 4,169,317 A | * | 10/1979 | Bone ........................ 33/501.04 |
| 4,226,025 A | * | 10/1980 | Wheeler ....................... 33/512 |
| 4,283,757 A | * | 8/1981 | Nalbandian et al. ......... 362/120 |
| 4,329,737 A | * | 5/1982 | Triller et al. ................. 362/555 |
| 4,407,075 A | * | 10/1983 | MacDermott et al. ...... 33/348.2 |
| 4,506,450 A | * | 3/1985 | Fleming et al. ........... 33/366.12 |
| 5,115,571 A | | 5/1992 | Mackin |
| 5,147,356 A | * | 9/1992 | Bhatta .......................... 606/37 |
| 5,628,556 A | * | 5/1997 | Hrabar et al. ................ 362/578 |
| 5,667,478 A | * | 9/1997 | McFarlin et al. ............ 600/182 |
| 5,921,654 A | * | 7/1999 | Coyle .......................... 362/120 |
| 6,428,180 B1 | * | 8/2002 | Karram et al. .............. 362/119 |
| 6,497,051 B1 | * | 12/2002 | Poole et al. ................... 33/784 |

* cited by examiner

Primary Examiner—Diego Gutierrez
Assistant Examiner—Tania Courson
(74) Attorney, Agent, or Firm—Cahill, von Hellens & Glazer P.L.C.

(57) ABSTRACT

An illuminated caliper device includes a caliper assembly having first and second caliper legs each having a pointed tip and a pivot end. A pivot support and first and second pivot elements pivotally connects the pivot ends of the first and second caliper legs to the pivot support. A battery housing attached to the pivot support contains a battery. First and second light emitting diodes are coupled by a switch mounted on the battery housing to first and second terminals of the battery and produced light that is directed to areas of the surface to be measured by pointed tips of the legs. The intensity and color of light emitted by the first light emitting diode are such as to sufficiently illuminate the surface under low ambient illumination conditions without disrupting acquired night vision of a user.

2 Claims, 2 Drawing Sheets

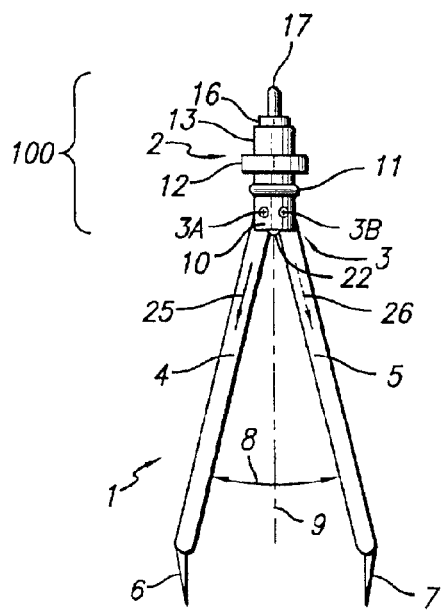
FIG. 1
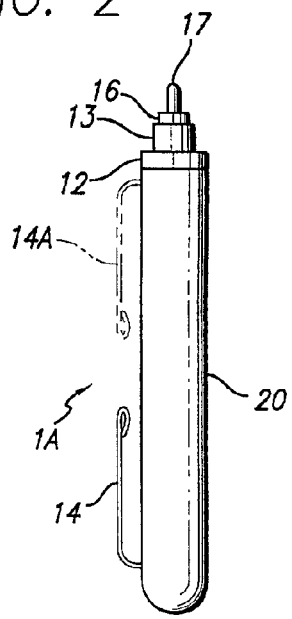
FIG. 2
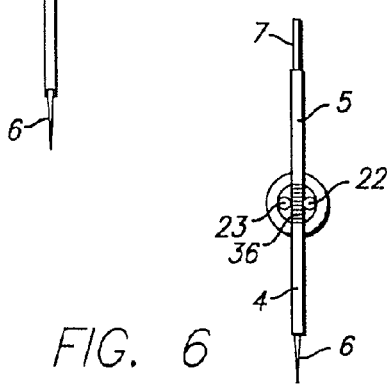
FIG. 3
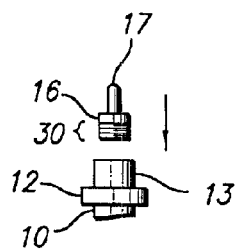
FIG. 4
FIG. 5
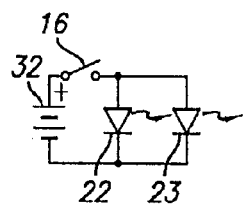
FIG. 6
FIG. 7

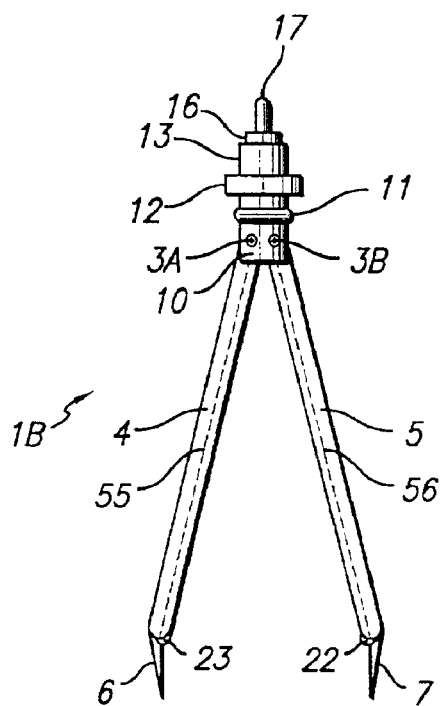
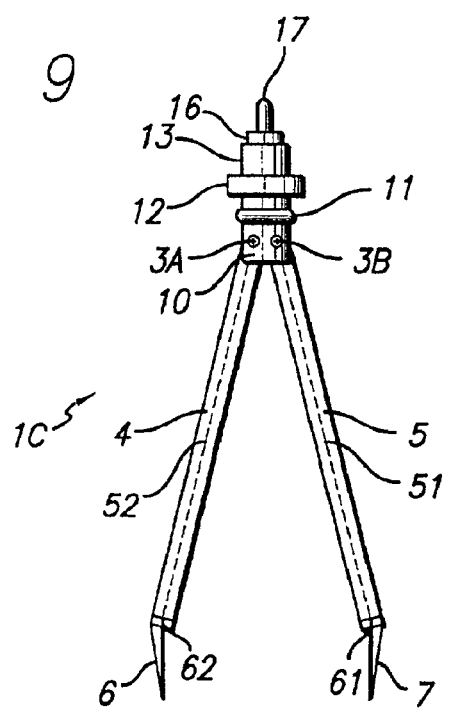

ILLUMINATED CALIPER INSTRUMENT

CROSS-REFERENCE TO RELATED APPLICATION

This application claims the benefit of prior filed co-pending U.S. provisional application Ser. No. 60/301,533 filed Jun. 27, 2001 entitled “ILLUMINATED CALIPER INSTRUMENT” by Robert A. Mackin and Jeffrey M. Mackin.

BACKGROUND OF THE INVENTION

The invention relates to calipers or caliper instruments (also sometimes referred to as dividers) of the type utilized by persons who work in dark environments, for example paramedics needing to make measurements on a medical chart plotted by a heart monitoring instrument under “field conditions”, navigators, aviators, and other persons who must measure the distance between two points of a chart plotted by an instrument, a map, or other document under very low ambient illumination conditions. It is important that the “night vision” of such persons not be temporarily disrupted by the presence of unnecessarily bright “white” light on the document (or other surface) to allow measurement of the distance between two points on the document. A person whose eyes are open for approximately 15 to 20 minutes under dark conditions or very low ambient illumination conditions acquires what is known as “night vision”, wherein the person’s eyes become much more sensitive to low levels of ambient illumination. If the eyes of a person who has acquired night vision are suddenly subjected to relatively bright light, especially white light, the person is subjected to what is referred to as “night blindness”, wherein the acquired night vision is lost. The person then must reacquire his/her night vision by remaining in no-light or very low-light conditions for another 15 to 20 minutes, during which he or she may be unable to recognize critically important things or occurrences in the low ambient light conditions in which the person is working.

Although a need for solving this problem has existed for long time, no practical means for solving the problem, such as a compact, reasonably inexpensive illuminated caliper instrument, has been provided.

U.S. Pat. No. 5,115,571, issued May 26, 1992, by present inventor Robert A. Mackin, discloses a caliper instrument including a gear mechanism wherein the upper ends of the caliper legs are interlocked by gear teeth so that the caliper legs of the symmetrically in opposite directions about a bisection axis.

SUMMARY OF THE INVENTION

Accordingly, it is an object of the invention to provide a caliper instrument which provides adequate illumination to a person working under night conditions for very low ambient illumination conditions for utilization of a caliper instrument to measure or delineate the distance between points on a document or object without impairing the night vision of the person measuring coordinating the distance between the points.

Briefly described, and in accordance with one embodiment thereof, the invention provides a caliper instrument including a light emitting diode, a battery, and an on/off switch contained/installed in a hub of the illuminated caliper instrument from which its caliper legs extend. The light emitting diode is oriented to illuminate an area on the document including a pair of points the distance between which is to be measured or delineated the by needle points of the caliper instrument. In one described embodiment, two light emitting diodes, preferably red light emitting diodes or green light emitting diodes, are contained/installed in/on the hub of the caliper instrument. The optical axis of one of the light emitting diodes is oriented at a predetermined angle relative to a bisection axis of the optical instrument, and the optical axis of the other light emitting diode is oriented at an asymmetrically opposite angle relative to the bisection axis, so that points of the document touched by the needle points of the caliper instrument when its caliper legs are opened wide are equally and adequately illuminated. In one embodiment, the light emitting diodes are mounted directly on lower portions of the legs to direct the light precisely to areas of the document or object to be measured by the needle points. In another embodiment, fiber optic elements extend between each light emitting diode and a corresponding fiber optic lens attached to a lower portion of a corresponding leg.

BRIEF DESCRIPTION OF THE DRAWINGS

FIG. 1 is a front elevational view of one embodiment of the illuminated caliper instrument of the present invention, in an open configuration.

FIG. 2 is an elevational view of the caliper instrument of FIG. 1 in a closed configuration with a protective cap installed.

FIG. 3 is a side elevational view of the illuminated caliper instrument of FIG. 1.

FIG. 4 is a partial exploded elevational view of the upper portion of the illuminated caliper instrument of FIG. 1.

FIG. 5 is a top view of a battery housing of the illuminated caliper instrument of FIG. 1.

FIG. 6 is bottom view of the illuminated caliper instrument of FIG. 1 with its caliper legs spread wide open.

FIG. 7 is a schematic diagram of the circuitry including the battery, switch assembly and light emitting diodes in the illuminated caliper instrument of FIG. 1.

FIG. 8 is a front elevational view of another embodiment of the illuminated caliper instrument of the present invention in which the light emitting diodes are attached to lower portions of the caliper legs.

FIG. 9 is a front elevational view of one embodiment of the illuminated caliper instrument of the present invention in which fiber optic bundles are coupled between the light emitting diodes and corresponding fiber optic lens attached to lower portions of the caliper legs.

DETAILED DESCRIPTION OF THE PREFERRED EMBODIMENTS

Referring to FIG. 1, illuminated caliper instrument 1 includes a hub 100 from which a pair of caliper legs 4 and 5 downwardly extend. Hub 100 includes an upper section 2 and a lower section 3. A pair of needles 6 and 7 extend downwardly from the lower ends of legs 4 and 5, respectively. Legs 4 and 5 are attached to a gear mechanism 36 in lower section 3 (see the bottom view shown in FIG. 6) which can be essentially identical to that disclosed in the above referenced U.S. Pat. No. 5,115,571, so that when the caliper legs 4 and 5 are pivoted about pivot ends 3A and 3B so that caliper legs 4 and 5 are “opened” or “closed” as indicated by are 8, the movement of each leg 4 and 5 is symmetrically opposite with reference to a bisection axis 9. (Alternatively, the upper ends of legs 4 and 5 can be pivotally attached to hub 100 without use of gear mechanism 36.)

Lower section 3 includes the above-mentioned gear mechanism 36, which includes two engaged gears attached to the upper ends 28 of caliper legs 4 and 5, which are pivotally connected to a gear housing 10. An annular cap retaining ring 12 is rigidly attached to and disposed around the periphery of the upper portion of gear housing 10. The plane of retaining ring 12 is perpendicular to bisection axis 9. An O ring 11 is disposed in a groove (not shown), the plane of which is parallel to the plane of cap retaining ring 12.

Upper section 2 includes a cylindrical battery housing 13 into which a switch mechanism 16 having outer threads 30 is threaded. Switch mechanism 16 includes a suitable switch control element 17, which can be a rotary device or a depressible switch button or the like.

As shown in FIG. 2, when legs 4 and 5 are in a "closed" configuration, i.e., have been moved close to each other so that both are parallel to bisection axis 9, then a protective cylindrical cap 20 can be slid over O ring 11 and abutted against the lower edge of annular cap retaining ring 12. A suitable pocket clip 14 can be attached to the lower end of protective cap 20 as shown in FIG. 2, wherein reference numeral 1A designates the illuminated caliper instrument 1 with protective cap 20 in place. If desired, pocket clip 14 can instead be provided at the upper end of protective cap 20 as indicated by dotted lines 14A.

Referring to FIGS. 1 and 3, a first light emitting diode 22 and a second light emitting diode 23 are powered by the battery 32 (FIG. 5) retained in battery housing 13 when switch mechanism 16 is actuated or turned on. Battery 32 can be a suitable, readily available hearing aid type of battery or button-type battery.

First light emitting diode 22 is installed at the bottom portion of gear housing 10 adjacent to the left side of legs 4 and 5 as shown in FIGS. 1 and 3, so that the optical axis of light emitting diode 22 is generally oriented in a direction indicated by arrow 25, so as to adequately illuminate a portion of a document or other surface (not shown) to be contacted by the tip of needle 6 when legs 4 and 5 are spread fairly far apart. Similarly, second light emitting diode 23 is installed on the right side of legs 4 and 5 as shown in FIG. 3, so that the optical axis of light emitting diode 23 is generally oriented in a direction indicated by arrow 26, so as to adequately illuminate a portion of the document or surface to be contacted by the tip of needle 7 when legs 4 and 5 are spread fairly far apart.

Light emitting diodes 22 and 23 can be, for example, red light emitting diodes or green light emitting diodes of recent high-intensity design. In recent years, low-power light emitting diodes of sufficiently high intensity to illuminate a document for reading purposes have become available. Such light emitting diodes are available in both red and green colors, which are less likely to interfere with the night vision of a person such as a paramedic, navigator, aviator astronomer, or the like who is working in darkness or in low ambient light conditions and is depending on his/her "night vision" to accomplish his/her work.

Therefore, when such person turns on light emitting diodes 22 and 23 of illuminated caliper instrument 1 to measure the distance between two points on the document, the intensity of the illumination produced on the document by light emitting diodes 22 and 23 does not appreciably interfere with the person's night vision because the light is directed to the document or surface rather than to the person's eyes. The significantly reduces the chance of the person undergoing night blindness.

Referring to FIGS. 4 and 5, the switch mechanism 16 has peripheral threads 30 disposed on its lower portion. The external threads 30 mate with internal threads 34 of battery housing 13, so switch assembly 16 can be threaded into battery housing 13 when battery 32 is in place within battery housing 13.

FIG. 7 shows the schematic diagram of the light emitting diodes 22 and 23, switch assembly 16, and battery 32 referred to above. Battery 32 actually is composed of several button type batteries stacked in series. The (+) terminal of battery 32 is connected to one terminal of switch assembly 16, the other terminal of which is connected to the anodes of light emitting diodes 22 and 23. The cathodes of light emitting diodes 22 and 23 are connected to the negative terminal of battery 32. (Alternatively, light emitting diodes 22 and 23 could be connected in series.)

In another embodiment, light emitting diodes 22 and 23 are attached directly to upper portions of caliper legs 4 and 5, respectively, so that the optical axes of the two light emitting diodes change direction along with the longitudinal axes caliper legs 4 and 5, respectively, as they are moved in the directions indicated by are 8.

In another embodiment 1B shown in FIG. 8, light emitting diodes 22 and 23 are attached directly to lower ends of caliper legs 4 and 5, respectively, so that the optical axes of the two light emitting diodes change direction along with the longitudinal axes of caliper legs 4 and 5, respectively, as they are moved in the directions indicated by are 8. The shorter distances between the between the light emitting diodes and the document or object to be measured results in increased illumination thereof. In this case, two pairs of electrical conductors 55 and 56 extending along caliper legs and 5 and 4, respectively, couple light emitting diodes 22 and 23, respectively, to switch mechanism 16 and battery 32.

In another alternative embodiment 1C shown in FIG. 9, two pairs of fiber optic bundles 51 and 52 extend along caliper legs 5 and 4, respectively, to couple light emitting diodes 22 and 23 to fiber optic lenses 62 and 61 which are respectively attached to the lower ends of caliper legs 5 and 4. This arrangement directs the light precisely and with increased intensity to smaller areas of the document or object to be contacted and/or measured by the tips of the needles 6 and 7.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention.

For example, in some cases a single light emitting diode could be provided, for example, between caliper legs 4 and 5, to illuminate the area of the document or surface to be measured.

What is claimed is:

1. An illuminated caliper device, comprising:
   (a) a caliper assembly including
     i. first and second caliper legs each having a pointed tip and a pivot end,
     ii. first and second pivot elements attached to the pivot ends of the first and second caliper legs, respectively, the first and second pivot elements engaging each other to cause symmetrical opening and closing of the first and second caliper legs,
     iii. a pivot support and first and second pivot elements pivotally connecting the pivot ends of the first and second caliper legs to the pivot support; and (b) a battery housing attached to the pivot support;
(c) a first light emitting diode mounted to the housing and coupled by a switch to first and second terminals of the battery, and having an optical axis extending along the first leg to an area of the surface containing a first point to be measured by the pointed tip of the first caliper leg, and a second light emitting diode coupled by the switch to the first and second terminals of the battery, the second light emitting diode being mounted to the housing and having an optical axis extending along the second leg to an area of the surface containing the second point to be measured by a pointed tip of the second caliper leg,
(d) said diodes illuminating an area between and including said first and second points, wherein the first and second light emitting diodes emit light with intensity and color that illuminate the surface and the first and second point thereof without disrupting acquired night vision of a user.

2. An illuminated caliper device, comprising:
(a) a caliper assembly including
  i. first and second caliper legs each having a pointed tip and a pivot end,
  ii. first and second gear elements attached to the pivot ends of the first and second caliper legs, respectively, the first and second gear elements engaging each other to cause symmetrical opening and closing of the first and second caliper legs,
  iii. a pivot support and first and second pivot elements pivotally connecting the pivot ends of the first and second caliper legs to the pivot support; and
(b) a battery housing attached to the pivot support;
(c) a first light emitting diode mounted to the housing and coupled by a switch to first and second terminals of the battery, and having an optical axis extending along the first leg to an area of the surface containing a first point to be measured by the pointed tip of the first caliper leg, and a second light emitting diode coupled by the switch to the first and second terminals of the battery, the second light emitting diode being mounted to the housing and having an optical axis extending along the second leg to an area of the surface containing the second point to be measured by a pointed tip of the second caliper leg.
(d) said diodes illuminating an area between and including said first and second points, wherein the first and second light emitting diodes emit light with intensity and color that illuminate the surface and the first and second point thereof without disrupting acquired night vision of a user.

* * * * *